May 16, 1950 G. E. DATH 2,507,760
FRICTION SHOCK ABSORBER
Filed May 9, 1946
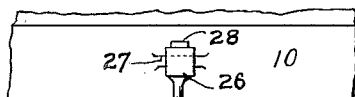
Fig. 1
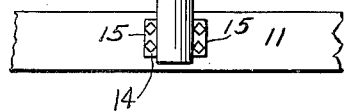
Fig. 2
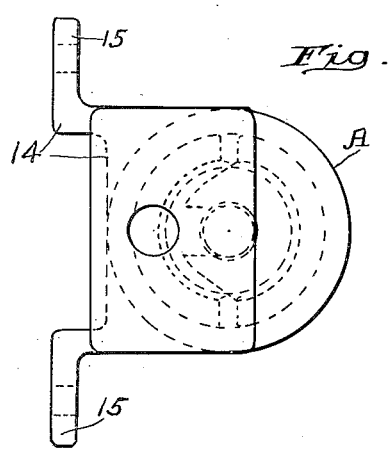
Fig. 3
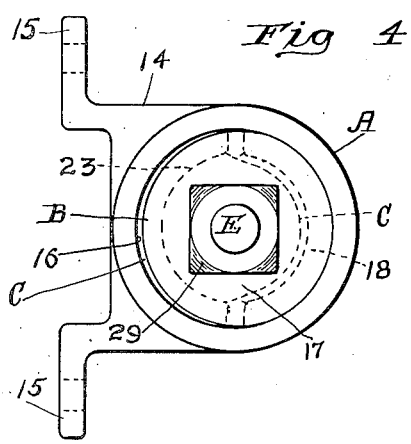
Fig. 4
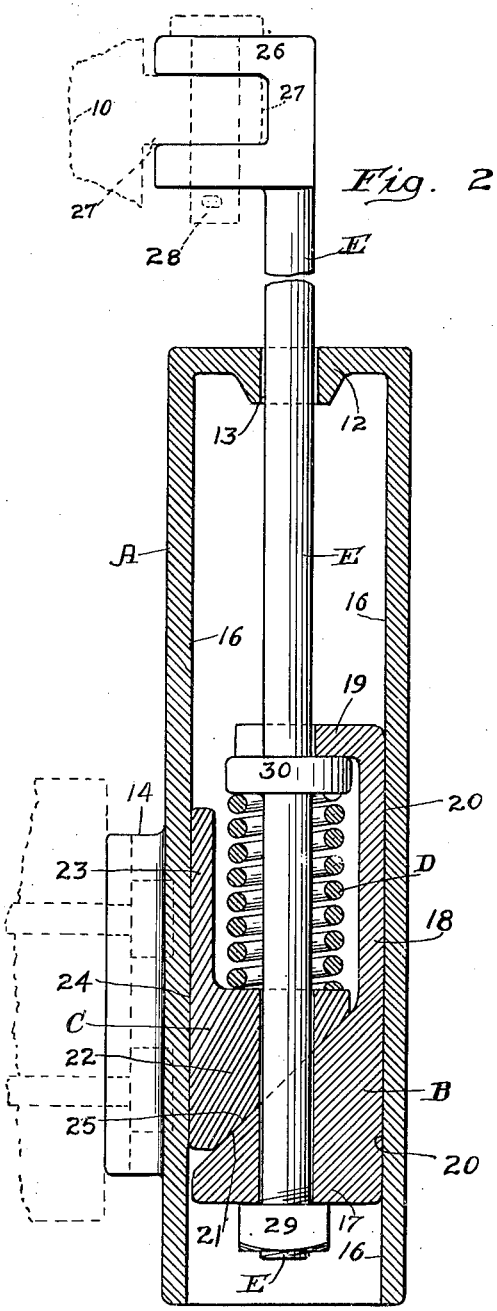
Inventor:
George E. Dath.
By Henry Fuchs.
Atty.

Patented May 16, 1950

2,507,760

UNITED STATES PATENT OFFICE 2,507,760

FRICTION SHOCK ABSORBER

George E. Dath, Mokena, Ill., assignor to W. H. Miner, Inc., Chicago, Ill., a corporation of Delaware Application May 9, 1946, Serial No. 668,514

7 Claims. (Cl. 188—129)

This invention relates to improvements in friction shock absorbers especially adapted for snubbing the spring action of railway car trucks.

One object of the invention is to provide a friction shock absorber of the character indicated comprising a friction casing, a friction clutch within the casing including friction shoes having interengaging wedge faces and spring means for effecting wedging action on the wedge faces of the shoes to force the latter apart, thereby expanding the clutch against the interior walls of the casing, wherein the clutch is movable in reverse directions lengthwise with respect to the casing by an actuating rod.

A further and more specific object of the invention is to provide a shock absorber as set forth in the preceding paragraph wherein movement of the clutch in one direction with respect to the casing is effected by shouldered engagement of the rod with one of the friction shoes, and movement of the clutch in a reverse direction is effected by a follower element rigid with said rod and bearing on one end of the spring which has its other end bearing on the other shoe and reacts between said shoe and said follower element to force the shoes into wedging engagement with each other.

Other objects of the invention will more clearly appear from the description and claims hereinafter following.

In the drawing forming a part of this specification, Figure 1 is a side elevational view of a portion of the side frame and a portion of the equalizer bar of a railway passenger car truck, illustrating my improved friction shock absorber applied thereto. Figure 2 is a central, longitudinal, vertical sectional view, on an enlarged scale, of the improved shock absorber illustrated in Figure 1, showing the clutch at the lower end of its stroke. Figure 3 is a top plan view of Figure 2. Figure 4 is a bottom plan view of Figure 2.

In the drawing, referring more particularly to Figures 1 and 2 thereof, 10 indicates one of the side frame members of a well known type of railway passenger car truck and 11, the usual equalizer bar at the corresponding side of the truck. As is well known to those skilled in this art, the car truck includes the usual truck springs which support the car. As these springs are compressed and expand, the side frame member 10 and the equalizer bar 11 move relatively toward and away from each other. In carrying out my invention, my improved shock absorber is connected to and reacts between the side frame member 10 and the equalizer bar 11 to effect snubbing action of the truck springs.

My improved shock absorber, as shown in the drawing, comprises broadly a friction casing A; two friction shoes B and C having wedging engagement with each other; a spring D for yieldingly holding the shoes in wedging engagement; and an actuating rod or bar E.

The casing A is in the form of a cylindrical, tubular member open at its lower end and closed at its upper end by a transverse wall 12, provided with a central perforation 13 which accommodates the actuating rod for sliding movement. Adjacent the lower end, the casing is provided with an integral bracket member 14, which is located at one side thereof and has laterally projecting, perforated, securing flanges 15—15. The casing is supported on the equalizer bar 11 by the bracket 14; the flanges 15—15 thereof being bolted to said bar, as clearly shown in Figures 1 and 2. The interior of the casing presents a longitudinally extending friction surface 16 of substantially cylindrical form.

The friction shoe B is in the form of an elongated slide having an enlarged portion or head 17 at its lower end and a stem 18 extending upwardly from said head, the upper end of the stem being provided with a laterally inwardly projecting forked flange 19 which forms an abutment member. On the outer side, the shoe B has a cylindrical friction surface 20, which is slidably engaged with the interior friction surface 16 of the casing. The head 17 of the shoe presents a substantially flat wedge face 21 on the inner side thereof which cooperates with the shoe C.

The shoe C is also in the form of a slide and has a head 22 at its lower end and an upwardly extending stem 23 projecting from said head. On the outer side, the shoe C has a cylindrical friction surface 24 which is slidably engaged with the interior friction surface 16 of the casing A. On the inner side, at the lower end thereof, the head 22 of the shoe C presents a substantially flat wedge face 25, correspondingly inclined to and engaging the wedge face 21 of the shoe B.

The actuating rod or bar E is preferably of cylindrical, transverse cross section and has a laterally extending forked head 26 at its upper end which serves to anchor the bar to the side frame member 10 of the car truck. As shown, the side frame member 10 is provided with a projecting lug 27, which the forked head 26 embraces, and to which the same is secured by a pin 28, extending through the arms of said forked head and the lug 27. The rod or bar E extends through the perforation 13 of the end wall 12 of the casing, the opening between the arms of the forked portion of the flange 19, and through aligned openings in the head 17 of the shoe B and the head 22 of the shoe C. The lower end of the rod E is threaded and said end is provided with a nut 29 which is shouldered against the underneath side of the head of the shoe B. Between its ends, the rod E has an integral collar 30 which bears on the underneath side of the flange 19 of the shoe B and forms a spring follower member.

The spring D, which is in the form of a helical coil, surrounds the bar E and has its top and bottom ends bearing respectively on the underneath side of the collar 30 and the upper end face of the head 22 of the shoe C. The spring D is preferably under initial compression in the assembled condition of the mechanism and reacts between the collar or spring follower member 30 of the rod E and the shoe C to press the wedge faces of the shoes into tight engagement with each other.

As will be evident, the two shoes B and C, together with the spring D, form a friction clutch which is movable lengthwise of the casing A and is actuated by the rod or bar E, being moved upwardly by shouldered engagement of the nut 29 of the rod with the shoe B, and downwardly by the spring follower member or collar 30 of said bar through the medium of the spring D, which the collar engages.

The parts of my improved shock absorber are preferably proportioned so that, in its applied condition, when mounted on the car truck, the clutch is normally in a position midway of the length of its travel within the casing, and when the truck springs are being compressed moves downwardly toward the position shown in Figure 2.

The operation of my improved shock absorber is as follows: As the truck side frame member 10 and the equalizer bar 11 of the car truck approach each other during compression of the truck springs, the rod E is forced downwardly with respect to the casing A, carrying the shoes B and C therewith, through the medium of the spring D. Figure 2 shows approximately the limit of the downward stroke. During this action, the shoes are pressed into tight wedging engagement with each other by the spring, thus expanding the clutch and forcing the friction surfaces of the shoes into tight frictional engagement with the inner wall of the casing. The required frictional resistance to snub the action of the truck springs is thus produced during downward movement of the clutch in the casing. As will be evident, due to the static friction between the shoes and the casing, the spring D will be slightly compressed before the shoes begin to move. This slight compression of the spring takes care of relatively small vibrations of the truck springs. After the shoes begin to move, the spring D projects the shoes to bring the shoe B into shouldered engagement with the nut 29, and the collar 30 of the rod E into shouldered engagement with the flange 19 of said shoe. During recoil of the truck springs, the truck side frame member 10 and the equalizer bar 11 are forced apart and the rod E is pulled upwardly, carrying the shoe B therewith by shouldered engagement of the nut of the rod with said shoe. The required snubbing action is thus produced during both compression and recoil of the truck springs. The frictional resistance provided is substantially constant throughout the up and down movements of the friction clutch.

I claim:

1. In a friction shock absorber, the combination with a friction casing; of a pair of friction shoes telescoped within the casing and in sliding frictional engagement therewith, one of said shoes having a lengthwise extending arm at one end provided with an inturned flange at its outer end; an actuating rod having a shoulder bearing on the other end of said last named shoe and a fixed collar between its ends bearing on the inner side of said flange; and a spring reacting between said collar and the other shoe for forcing said shoes together, said shoes having cooperating wedge faces.

2. In a friction shock absorber, the combination with a vertically disposed friction casing; of an actuating rod movable lengthwise with respect to the casing, said rod having a shoulder at the lower end thereof; a friction shoe seated on said shoulder and having sliding frictional engagement with the interior of the casing, said shoe having an upwardly facing wedge face at its lower end; a second shoe having sliding frictional engagement with the interior of the casing, said second named shoe having a wedge face at its lower end engaged with the wedge face of the first named shoe; a fixed collar on said rod above said shoes; a downwardly facing abutment on said first named shoe at the upper end thereof engaged over said collar; and a spring reacting between said collar and second named shoe for forcing the latter against the first named shoe.

3. In a friction shock absorber, the combination with a longitudinally movable actuating rod; of a friction casing into which said rod extends, said rod being movable lengthwise with respect to the casing; an abutment at the lower end of said rod; a fixed spring follower member on said rod spaced above said abutment; a friction shoe supported on said abutment, said shoe having sliding frictional engagement with the interior of the casing, said shoe having a lateral wedge projection on the inner side at the lower end thereof; a second shoe having sliding frictional engagement with the interior of the casing, said second shoe having a lateral wedge projection on the inner side at the lower end thereof in wedging engagement with the wedge projection of said first named shoe; and a spring surrounding said rod and having its opposite ends bearing respectively on the wedge projection of said second named shoe and the spring follower of said rod.

4. In a friction shock absorber, the combination with a friction casing; of an actuating rod extending into said casing, said rod and casing being movable lengthwise with respect to each other; a pair of stop shoulders on said rod, said shoulders being spaced apart lengthwise of said rod; a pair of friction shoes on said rod, said shoes having sliding frictional engagement with the interior of the casing and being provided with interengaging wedge faces; and a spring reacting between one of said shoulders of said rod and one of said shoes to force the latter against the other shoe. said last named shoe being buttressed against the other shoulder of said rod.

5. In a shock absorber for railway car trucks including the usual truck springs, truck side frame and equalizer bar, the combination with a vertically disposed friction casing secured to the equalizer bar; of a vertically disposed actuating rod fixed to the truck side frame above said casing, said rod extending into the casing and having vertically spaced, upper and lower stop projections thereon; a friction shoe supported on said lower stop projection and having sliding frictional engagement with the interior wall of the casing, said shoe having an upwardly facing wedge face thereon; a second friction shoe having sliding frictional engagement with the interior wall of the casing, said second named shoe having a downwardly facing wedge face engaging the wedge face of the first named shoe; and a spring interposed and reacting between said second named shoe and the upper stop projection of the rod, said spring being under initial compression.

6. In a friction shock absorber, the combination with a friction casing having an interior friction surface; of a friction unit slidingly telescoped within the casing; an actuating rod extending into the casing and through said unit; a shoulder on said rod; a fixed collar on said rod spaced inwardly of said shoulder, said friction unit including a friction shoe bearing at one end on said shoulder, and a second shoe in wedging engagement at its outer end with said first named shoe, said second named shoe having a transverse abutment face inwardly of said outer end, and said first named shoe having a laterally inwardly projecting flange at its inner end with the inner side of which said collar of said rod is engaged; and a spring reacting between said collar and second named shoe, said spring bearing at opposite ends on the transverse abutment face of said second named shoe and on said collar, respectively.

7. In a friction shock absorber, the combination with a friction casing having an interior friction surface; of a friction clutch slidingly telescoped within the casing; an actuating rod extending into the casing and through said clutch; a shoulder on said rod at the bottom end thereof; a fixed collar on said rod spaced inwardly from said shoulder, said friction clutch including a friction shoe having its lower end abutting said shoulder, and a second shoe in wedging engagement at its lower end with said first named shoe, said second named shoe having an upwardly facing spring abutment spaced inwardly from the lower end thereof, and said first named shoe having a laterally inwardly projecting flange at its upper end engaged over the collar of said rod; and a spring embraced between said shoes and bearing at its top and bottom ends, respectively, on said collar and said spring abutment of said second named shoe.

GEORGE E. DATH.

REFERENCES CITED

The following references are of record in the file of this patent:

UNITED STATES PATENTS

| Number | Name | Date |
|---|---|---|
| 2,237,318 | Snyder | Apr. 8, 1941 |
| 2,379,078 | Haseltine | June 26, 1945 |
| 2,396,547 | Young | Mar. 12, 1946 |
| 2,404,666 | Snyder | July 23, 1946 |